US009432306B2

United States Patent
Khasnabish

(10) Patent No.: US 9,432,306 B2
(45) Date of Patent: *Aug. 30, 2016

(54) SYSTEM AND METHOD FOR CLOUD-BASED IMPLEMENTATION OF CONTROL OF FOCUSED OVERLOAD OF NETWORK ELEMENT (COFO-NE)

(71) Applicants: ZTE Corporation, Shenzhen (CN); ZTE (USA) Inc., Austin, TX (US)

(72) Inventor: Bhumip Khasnabish, Lexington, MA (US)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/348,479

(22) PCT Filed: Sep. 28, 2012

(86) PCT No.: PCT/US2012/057783
§ 371 (c)(1),
(2) Date: Mar. 28, 2014

(87) PCT Pub. No.: WO2013/049480
PCT Pub. Date: Apr. 4, 2013

(65) Prior Publication Data
US 2014/0229623 A1 Aug. 14, 2014

Related U.S. Application Data

(60) Provisional application No. 61/541,381, filed on Sep. 30, 2011.

(51) Int. Cl.
*H04L 12/24* (2006.01)
*H04L 12/703* (2013.01)
(Continued)

(52) U.S. Cl.
CPC ........ *H04L 47/803* (2013.01); *H04L 41/0668* (2013.01); *H04L 41/0806* (2013.01);
(Continued)

(58) Field of Classification Search
CPC . H04L 65/1016; H04L 67/141; H04L 67/10; H04L 69/321; H04L 67/02; H04L 12/1863; H04L 45/22; H04L 45/28; H04L 41/0668
See application file for complete search history.

(56) References Cited

U.S. PATENT DOCUMENTS 7,796,608 B2 * 9/2010 Rawlins .............. H04L 12/5695
370/351
7,938,727 B1 * 5/2011 Konkle .......................... 463/42
(Continued)

FOREIGN PATENT DOCUMENTS

CN 101401357 A 4/2009
WO WO-2011/049742 A2 4/2011
WO WO-2011/118585 A1 9/2011

OTHER PUBLICATIONS

Marc Sune, "Deliverable 5.1—1st Version of the OFELIA Management Software", Mar. 7, 2011, OFELIA Consortium, XP055182878.
(Continued)

*Primary Examiner* — Patrice Winder
*Assistant Examiner* — Aye M Aung
(74) *Attorney, Agent, or Firm* — Drinker Biddle & Reath LLP

(57) ABSTRACT

A system and method for cloud-based implementation of control of focused overload of network elements is disclosed. Resource blocks are obtained for a signaling part of a network element from a variety of networked resources. The resource blocks are integrated into a pool and a unified view is presented to applications and services communicating with the signaling part of the network element. The signaling part of the network element controls allocation of resources from a media part of the network element via instructions over virtual private network links. Resource blocks for the media part of the network element are obtained from a variety of networked resources, wherein the resource blocks are integrated into a pool and a unified view is presented to the signaling part of the network element. The media part of the network element uses the resource blocks for the applications and services for a duration of time, and additional borrowed resources are released after successful utilization.

16 Claims, 3 Drawing Sheets

Cloud-based Model for Implementing COFO-NE as Proposed in this Patent Application.

(51) Int. Cl.
*H04L 12/707* (2013.01)
*H04L 29/08* (2006.01)
*H04L 12/927* (2013.01)
*H04L 12/915* (2013.01)
*H04L 12/911* (2013.01)

(52) U.S. Cl.
CPC ........... *H04L41/0896* (2013.01); *H04L 45/22* (2013.01); *H04L 45/28* (2013.01); *H04L 47/781* (2013.01); *H04L 47/787* (2013.01); *H04L 67/10* (2013.01); *H04L 47/826* (2013.01)

(56) References Cited

U.S. PATENT DOCUMENTS

| | | | |
|---|---|---|---|
| 8,456,984 B2* | 6/2013 | Ranganathan | H04L 49/70 370/216 |
| 8,650,298 B2* | 2/2014 | Daly | G06F 9/505 709/226 |
| 2007/0002764 A1* | 1/2007 | Papadimitriou | 370/252 |
| 2007/0019619 A1* | 1/2007 | Foster et al. | 370/352 |
| 2007/0036151 A1* | 2/2007 | Baeder | 370/352 |
| 2007/0061433 A1 | 3/2007 | Reynolds et al. | |
| 2007/0211716 A1* | 9/2007 | Oz | H04L 12/4641 370/389 |
| 2010/0169392 A1 | 7/2010 | Lev Ran et al. | |
| 2010/0218192 A1 | 8/2010 | Dunn | |
| 2011/0113141 A1* | 5/2011 | Veenstra et al. | 709/226 |
| 2011/0119381 A1 | 5/2011 | Glover et al. | |
| 2011/0289119 A1* | 11/2011 | Hu et al. | 707/803 |
| 2012/0009903 A1* | 1/2012 | Schultz et al. | 455/412.2 |
| 2013/0003745 A1 | 1/2013 | Nishimura | |

OTHER PUBLICATIONS

Robert Sherwood, et al., "FlowVisor: A Network Virtualization Layer", Oct. 14, 2009, Openflow, XP002639208.

International Search Report for PCT/US2012/057783 mailed Mar. 11, 2013.

* cited by examiner

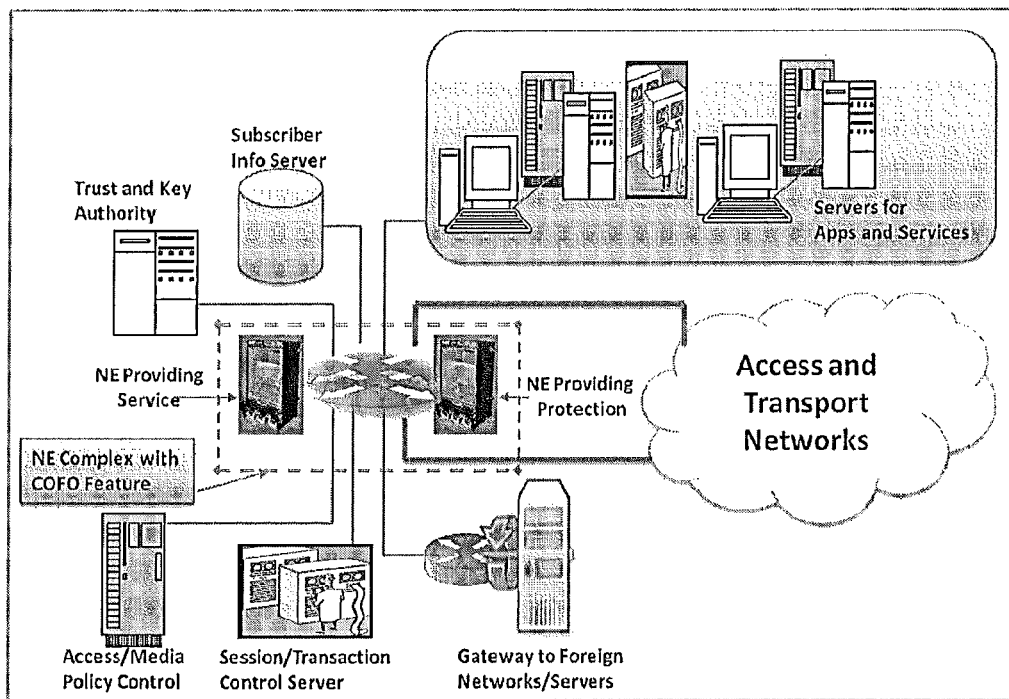
Figure 1: Traditional Implementation – using one for one standby - of Control of Focused Overload of Network Element (COFO-NE) [one for N standby is not shown].

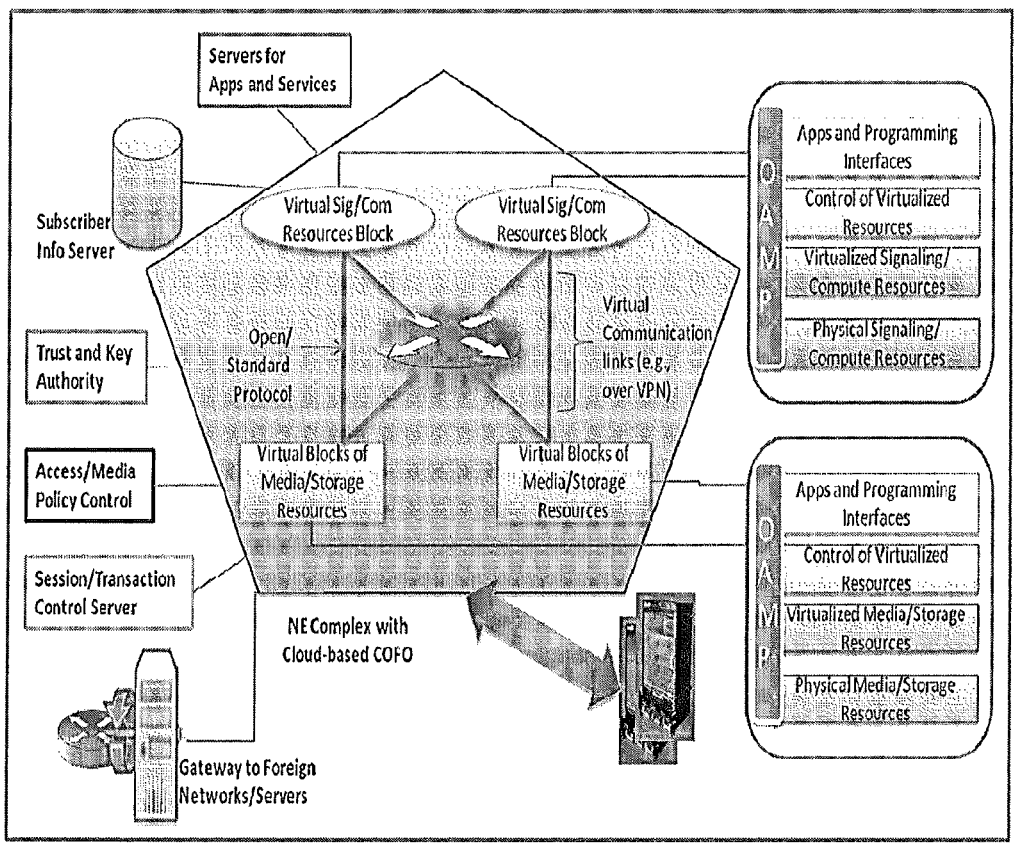
Figure 2: Cloud-based Model for Implementing COFO-NE as Proposed in this Patent Application.

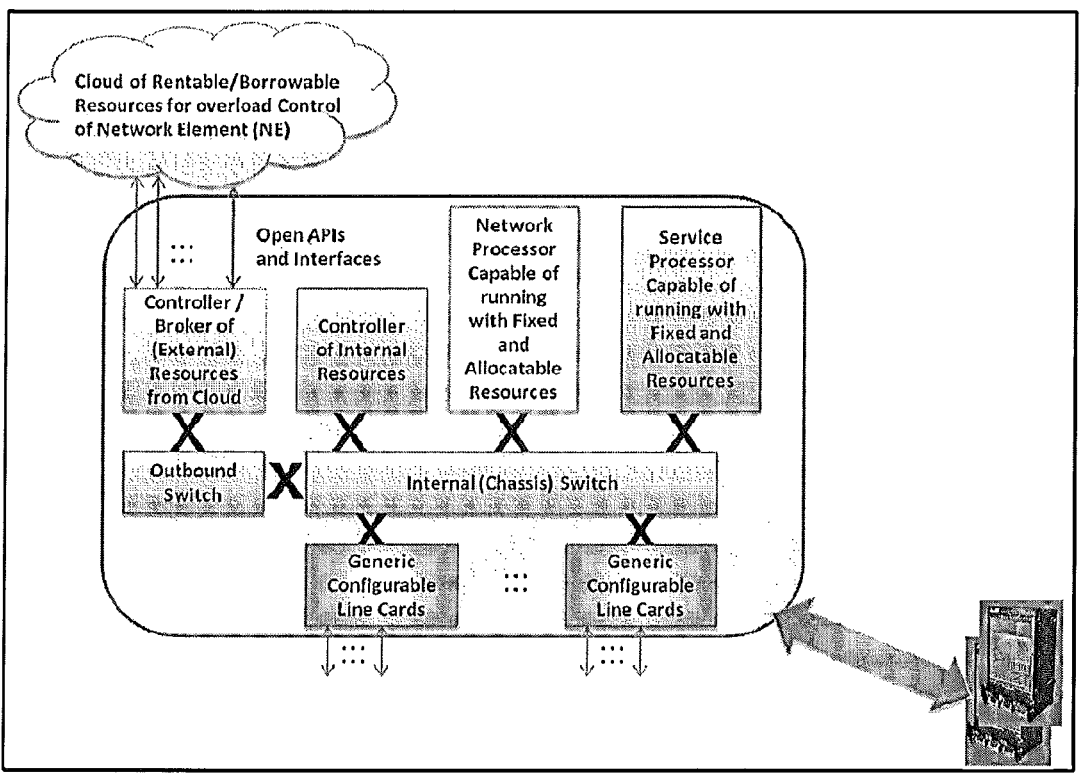
Figure 3: A detailed view of Cloud-based Implementation of the Proposed COFO of NE.

SYSTEM AND METHOD FOR CLOUD-BASED IMPLEMENTATION OF CONTROL OF FOCUSED OVERLOAD OF NETWORK ELEMENT (COFO-NE)

FIELD OF THE INVENTION

The field of the present invention is cloud-based systems, and more particularly, control of focused overload of network elements using cloud-based mechanisms and/or systems.

BACKGROUND

In communication networks, overload occurs when a network element has insufficient resources (e.g., CPU processing capacity, memory, network bandwidth, input/output, disk resources, etc.) to successfully process all of the requests that it receives. Some network elements can experience prolonged overload due to high rates of incoming service requests and/or partial network outage leading to failures. Focused overload is a special case of a network overload where the overload is focused on a subset of the network or network element. This subset can range from network destination (e.g., a telephone number or an IP address) to a group of switching and network servers.

In the absence of overload control, such overloads can threaten the stability of a communication network, and can cause a severe reduction in successful service completions. Ultimately, network elements can fail to provide service(s) due to lost requests resulting in the unavailability of services to clients. Often, overload problems can compound themselves, which can cause even more sustained load on a network element. Furthermore, during overload, the overall capacity of a server(s) can go down, since much of their resources are spent rejecting and/or treating loads that they cannot actually process. Under severe overload conditions, the throughput can drop down to a small fraction of the original processing capacity. This is often called congestion collapse. In addition, overload conditions tend to cause service requests to be delayed and/or lost, which can trigger high rates of client abandonment and/or reattempts.

Traditionally, focused overload is controlled in two different ways. One way is by reducing the incoming load by rejecting service requests. For example, only higher priority sessions or transactions may be allowed and all others may be rejected. Unfortunately, this may cause customer frustration, and ultimately churn, leading to loss of revenue.

Another way focused overload is controlled is by routing the incoming sessions or transaction requests to standby network elements which are usually owned and operated by the same organization that owns the network elements whose overload needs to be controlled. However, this may call for drastically higher capital and operations expense because neither the occurrence nor the duration of the overload events can be accurately predicted. Further, certain drawbacks of utilizing infrastructure element-based implementation of overload control of network elements include:
a) Cost;
b) Time required for testing and integration of overload control element with network;
c) Static allocation of resources;
d) Less flexibility in repositioning the resources; and
e) Tighter coupling of computing and communications resources with pre-designed border features and functions, as related to sessions/transactions.

Service providers in a dynamic and continuously-evolving networking and service development environment need:
a) Protection of investment, i.e., investment in the resources that can be rapidly repurposed for different revenue generating applications and services; and/or
b) Agility and flexibility, i.e., deploying emerging features and functions utilizing the computing and communications resources that already exist in the network.

Accordingly, there is a need for a system that enables network operators and service providers to allocate their budget for computing, communications, and control infrastructure development based on expected design limits. Consequently, there would be no need to create and install silos of computing and networking gears for controlling focused overload of network elements.

SUMMARY OF THE INVENTION

Aspects of the present invention address these issues and, for example, enable service providers to allocate their budget for computing, communications, and control infrastructure development rather than creating and installing these silos of computing and networking gears which very often either remain underutilized or become obsolete before reaching the full potential (or providing the full return on investment).

In one aspect, there is provided a method that includes obtaining blocks of resources for a signaling part of a network element from a variety of networked resources, wherein the resource blocks are integrated into a pool and a unified view is presented to applications and services communicating with the signaling part of the network element. The signaling part of the network element controls allocation of resources from a media part of the network element via instructions over virtual private network links. Blocks of resources for the media part of the network element are obtained from a variety of networked resources, wherein the blocks of resources are integrated into a pool and a unified view is presented to the signaling part of the network element. The media part of the network element uses the resource blocks for the applications and services for a duration of time. The duration of time can range from a few seconds to tens or hundreds of hours. The resource blocks can be obtained from public, private, or community networks through open application and resource programming interfaces (APIs and RPIs).

BRIEF DESCRIPTION OF THE DRAWINGS

FIG. 1 shows block diagrams of current models for control of focused overload of network element ("COFO-NE") implementations; and FIG. 2 presents a high level cloud-based COFO-NE implementation model.

FIG. 3 illustrates a detailed diagram of the cloud-based implementation of the COFO-NE.

DETAILED DESCRIPTION OF EMBODIMENTS

In traditional stand-alone or infrastructure element-based implementation of protection from focused overload of NE, dedicated computing, memory, and communications resources are required. These resources need to be integrated with the network infrastructure and need to be operated in a harmonious way both in terms of traffic management and privacy/authentication/security administration.

As a result, the time required for making the network ready for supporting the disaster management and overload control features/functions and the costs for successfully achieving the desired results become prohibitively high. For example, additional networking, control/processing, and protection resources need to be allocated and integrated for supporting the desired overload control features/functions.

According to certain aspects of the present invention, COFO-NE implementation overcomes the aforementioned drawbacks of traditional standalone overload control implementations because there is no need to pre-allocate computing, memory, and communications resources—either standalone or in the infrastructure network elements—for the purpose of controlling the overloads. Instead, the resources are obtained from public, private, or community networks via open application and resource programming interfaces (APIs and RPIs) through for example, resources broker or exchange firm.

These AIPs/RPIs can use any one or more of the following: SOAP, XML, WSDL, Parlay/Parlay-X, HTTP, CORBA, and the like. The details of the API/RPI design and profiling are beyond the scope of this patent application. It is notable that these APIs/RPIs not only simplify access to the desired resources, but also guarantee rapid integration and interoperability with the existing network/infrastructure, security, availability, service continuity, and the like. This is due to the fact that the desired overload control features/functions are obtained by selectively searching the available networked resources through open APIs/RPIs and fetching them so that they can be utilized per the requirements of the applications and services for the duration of the service. For example, real-time availability of firewalling and encryption key resources is useful for real-time enterprise secure voice communications services over the public Internet.

In sum, any application or service that needs to utilize overload control features/functions can obtain those resources through open APIs/RPIs from the network (e.g., the Internet) and then can use those resources for the duration of the session with guaranteed availability, security and reliability. In other aspects, the invention provides a system and a computer program having features and advantages corresponding to those discussed above.

FIG. 1 shows block diagrams of current COFO-NE implementations. The network element that is being protected is directly connected to an Application server, session control elements, service gateway, and the like. The network element receives a request for identity verification of a subscriber and a user in order to authenticate access to a transaction or a session-based service. The network element may use a pre-determined number of attributes (e.g., service name and location), credentials (e.g., secret codes or biometrics information), and identifier (names, userId, MACId, IP address, geo-location, etc.). The network element server may or may not control resources for session and media once the user/subscriber has been authenticated. It is possible that policy, quality of service and security requirements may dictate these allocations. The interface between the signaling elements of the NE and the media control elements of the NE can be open (standard protocol) or proprietary protocol, and the interface can be point-to-point or point-to-multipoint in order to support reliability through distribution of the resource requests.

The details of the Cloud framework reference model can be found at http://tools.ietf.org/id/draft-khasnabish-cloud-reference-framework-01.txt, which is incorporated by reference in its entirety.

FIG. 2 shows a COFO-NE implementation model according to an aspect of the present invention. In this implementation, the resources that constitute the Signaling and Media Control parts of the network element (for protecting from overload or for disaster management) are obtained from a set of networked resources, and utilized for the duration of time they are required, and then released back to the resources pool. This duration can vary from a few seconds to many hours.

The resource blocks for managing signaling overload control can be obtained from a variety of networked resources and these blocks can be integrated into a pool of network element resources so that a unified view can be presented to the applications and services—subscriber information/profile server, trust and key authority, access/media policy control, session/transaction control server—that are communicating with the Signaling part of the network element that is being protected from overload/disaster. The Signaling part of the network element controls the allocation of resources from the session and media control part of the network element with instructions over virtual private network links that run open protocol with a standardized profile.

The resources used for controlling the media part of the network element are obtained from a set of networked resources, and utilized for the duration of the requirements. This duration can vary from a few minutes to many hours. The resource blocks for the media part of the network element can be obtained from a variety of networked sources and these blocks can be integrated into a pool of the media control part of resources so that a unified view can be presented to the signaling part of the network element.

FIG. 3 shows further details of how a combination of fixed (internal) resources and borrowed or rented (external) resources can be utilized for control of focused overload on network elements in a cost-effective manner.

It should be understood that the methods and systems of the present invention are executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EE-PROM's); and the like. Implementations of certain embodiments may further take the form of machine-implemented, including web-implemented, computer software.

While aspects of this invention have been shown and described, it will be apparent to those skilled in the art that many more modifications are possible without departing from the inventive concepts herein. The invention, therefore, is not to be restricted except in the spirit of the following claims.

What is claimed is:

1. A method comprising: obtaining, for protection of network resources from overload and for disaster management, resource blocks for a signaling part of a distributed virtual network element that is hosted on a plurality of distributed tangible networked elements including a plurality of distributed computing processors communicatively coupled to a plurality of distributed storage devices from a variety of networked resources, wherein the resource blocks are integrated into a pool and a unified view of the pool as part of the distributed virtual network element is presented to applications and services communicating with the signaling part of the distributed virtual service network element;

controlling, by the signaling part of the distributed virtual network element, allocation of the resources from the media part of the distributed virtual network element via instructions over virtual network links;

obtaining resource blocks for the media part of the distributed virtual network element from the variety of networked resources, wherein the resource blocks are integrated into a pool and a unified view the pool is presented to the signaling part of the distributed virtual network element; and allocating and using the resource blocks for the applications and services for a duration of time; and releasing the resources after utilization.

2. The method of claim 1, wherein the distributed virtual network element is logically/distributed and non-integrated.

3. The method of claim 1, wherein the virtual network links include at least one of virtual private network links and virtual network links that run an open protocol with a standardized profile.

4. The method of claim 1, wherein the resource blocks are obtained from public, private, or community networks through open application and resource programming interfaces.

5. An apparatus comprising: a distributed virtualized network element that is realized in a plurality of distributed tangible networked elements including a plurality of distributed computing processors communicatively coupled to a plurality of distributed data storage devices, wherein the distributed virtualized network element, for protection of network resources from overload and for disaster management, obtains for a signaling part of the distributed virtualized network element resource blocks from a variety of networked resources, wherein the resource blocks are integrated into a pool and a unified view of the pool as a part of the distributed virtualized network element is presented to applications and services that communicate with the signaling part of the distributed virtualized network element; and wherein a media part of the distributed virtualized network element includes resource blocks from the variety of networked resources, wherein the resource blocks are integrated into a pool and a unified view of the pool is presented to the signaling part of the distributed virtualized network element;

wherein the signaling part of the distributed virtualized network element is further configured to control allocation of resources from the media part of the distributed virtualized network element via instructions over a plurality of virtual network links; and wherein the resource blocks for the applications and services are allocated to be used for a duration of time and released after utilization.

6. The apparatus of claim 5, wherein the distributed virtualized network element is distributed and non-integrated.

7. The apparatus of claim 5, wherein the virtual network links include at least one of virtual private network links and virtual network links that run an open protocol with a standardized profile.

8. The apparatus of claim 5, wherein the resource blocks are from public, private, or community networks through open application and resource programming interfaces.

9. A system comprising: means realized on a plurality of distributed tangible networked computing processors communicatively coupled to a plurality of distributed tangible networked data storage devices, wherein the means, for protection of network resources from overload and for disaster management, obtains for a signaling part of a distributed virtualized network element, resource blocks from a variety of networked resources, for protection of network resources from overload and for disaster management;

means realized on the processors and storage devices, for controlling allocation of resources from a media part of the distributed virtualized network element;

means realized on the processors and storage devices, for obtaining resource blocks for the media part of the distributed virtualized network element from the variety of networked resources, wherein the resource blocks are integrated into a pool and a unified view of the pool is presented to the signaling part of the distributed virtualized network element; and means realized on the processors and storage devices, whereby the distributed virtualized network element obtains for a signaling part of the distributed virtualized network element resource blocks from a variety of networked resources, wherein the resource blocks are integrated into a pool and a unified view of the pool as a part of the distributed virtualized network element is presented to applications and services that communicate with the signaling part of the distributed virtualized network element wherein the signaling part of the distributed virtualized network element operates over a plurality of virtual network links; and wherein the resource blocks for the applications and services are allocated for a duration of time.

10. The system of claim 9, wherein the distributed virtualized network element is distributed and non-integrated.

11. The system of claim 9, wherein the virtual network links include at least one of virtual private network links and virtual network links that run an open protocol with a standardized profile.

12. The system of claim 9, wherein the resource blocks are obtained from public, private, or community networks through open application and resource programming interfaces.

13. An article of manufacture including a non-transitory computer-readable medium having instructions stored thereon executable on a plurality of networked computing processors communicatively coupled to a plurality of networked data storage devices as a distributed virtual network element, the instructions comprising:

instructions for obtaining, for protection of network resources from overload and for disaster management, resource blocks for a signaling part of the distributed virtual network element from a variety of networked resources, wherein the resource blocks are integrated into a pool and a unified view of the pool as part of the distributed virtual network element is presented to applications and services communicating with the signaling part of the distributed virtual network element;

instructions for controlling, by the signaling part of the distributed virtual network element, allocation of resources from a media part of the distributed virtual network element via instructions over a plurality of virtual network links;

instructions for obtaining resource blocks for the media part of the distributed virtual network element from the variety of networked resources, wherein the resource blocks are integrated into a pool and a unified view of the pool is presented to the signaling part of the distributed virtual network element; and instructions for allocating the resource blocks for applications and services for a session duration, or transaction length, of time.

14. The article of manufacture of claim 13, wherein the distributed virtual network element is distributed and non-integrated.

15. The article of manufacture of claim 13, wherein the virtual network links include at least one of virtual private network links and network links that run an open protocol with a standardized profile.

16. The article of manufacture of claim 13, wherein the resource blocks are obtained from public, private, or community networks through open application and resource programming interfaces.

* * * * *